United States Patent
Lee

(10) Patent No.: US 11,330,059 B2
(45) Date of Patent: May 10, 2022

(54) HEAD UNIT OF A VEHICLE, A VEHICLE HAVING SAME, AND A METHOD OF CONTROLLING A VEHICLE

(71) Applicants: HYUNDAI MOTOR COMPANY, Seoul (KR); KIA MOTORS CORPORATION, Seoul (KR)

(72) Inventor: Hwangjik Lee, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 698 days.

(21) Appl. No.: 15/823,892

(22) Filed: Nov. 28, 2017

(65) Prior Publication Data

US 2019/0068718 A1    Feb. 28, 2019

(30) Foreign Application Priority Data

Aug. 22, 2017 (KR) .................. 10-2017-0106145

(51) Int. Cl.
*H04L 67/125* (2022.01)
*H04W 4/40* (2018.01)
(Continued)

(52) U.S. Cl.
CPC ........ *H04L 67/125* (2013.01); *H04L 41/0226* (2013.01); *H04L 67/12* (2013.01);
(Continued)

(58) Field of Classification Search
None
See application file for complete search history.

(56) References Cited

U.S. PATENT DOCUMENTS

2012/0066419 A1 * 3/2012 Park .................... H04M 1/7253
710/62
2014/0196142 A1 * 7/2014 Louboutin ............. G06F 21/44
726/16
(Continued)

FOREIGN PATENT DOCUMENTS

KR  20120088008 A    8/2012
KR  20140017831 A *  2/2014

OTHER PUBLICATIONS

Office Action cited in corresponding Korean app No. 10-2017-0106145; dated Sep. 20, 2021; 5 pp.

*Primary Examiner* — Mohamed Ibrahim
(74) *Attorney, Agent, or Firm* — Lempia Summerfield Katz LLC

(57) ABSTRACT

A head unit of a vehicle is capable of defining a policy about conversion of interworking means between the vehicle and a mobile device and controlling conversion of the interworking means according to the defined policy to thereby minimize a delay generated upon conversion and to provide a service without interruption. A vehicle includes the head unit and a method of controlling the vehicle includes the head unit. The head unit of a vehicle interworking with a mobile device comprises: a communication interface including a wired communication module and a wireless communication module; a display configured to display an image corresponding to a video signal transmitted from the mobile device through the communication interface; and a controller configured to determine, if a new interworking request is received when the head unit interworks with the mobile device, whether the interworking with the mobile terminal is wired interworking through the wired communication module or wireless interworking through the wireless communication module. The controller is configured to determine (Continued)

whether to allow or disallow the new interworking request according to the determination.

23 Claims, 13 Drawing Sheets

(51) Int. Cl.
<table>
<tr><td>H04L 67/141</td><td>(2022.01)</td></tr>
<tr><td>H04L 67/12</td><td>(2022.01)</td></tr>
<tr><td>H04W 4/48</td><td>(2018.01)</td></tr>
<tr><td>H04W 4/80</td><td>(2018.01)</td></tr>
<tr><td>H04L 41/0226</td><td>(2022.01)</td></tr>
<tr><td>H04L 67/303</td><td>(2022.01)</td></tr>
<tr><td>H04W 84/00</td><td>(2009.01)</td></tr>
</table>

(52) U.S. Cl.
CPC ............ *H04L 67/141* (2013.01); *H04W 4/40* (2018.02); *H04W 4/48* (2018.02); *H04W 4/80* (2018.02); *H04L 67/303* (2013.01); *H04W 84/005* (2013.01)

(56) References Cited

U.S. PATENT DOCUMENTS

2016/0197782 A1* 7/2016 Hort .................... H04L 41/0809
709/222
2017/0195325 A1* 7/2017 Yamamoto ............. H04W 4/40

\* cited by examiner

FIG. 6

| CONNECTION STATE | | MANIPULATION | OPERATION | NOTES |
|---|---|---|---|---|
| NOT INTERWORKING WITH MOBILE DEVICE | | REQUEST WIRED/WIRELESS INTERWORKING WITH MOBILE DEVICE | ALLOW WIRED/WIRELESS INTERWORKING WITH MOBILE DEVICE | — |
| INTERWORKING WITH MOBILE DEVICE | WIRED | REQUIRE WIRELESS INTERWORKING WITH MOBILE DEVICE (SAME DEVICE/OTHER DEVICE) | MAINTAIN WIRED INTERWORKING | BLOCK WIRELESS INTERWORKING |
| | WIRELESS | REQUEST WIRED INTERWORKING WITH SAME MOBILE DEVICE | CONVERT FROM WIRELESS TO WIRED | BLOCK WIRELESS INTERWORKING |
| | | REQUEST WIRED INTERWORKING WITH OTHER MOBILE DEVICE | MAINTAIN WIRELESS INTERWORKING | MAINTAIN CHARGING STATE OF OTHER MOBILE DEVICE |

HEAD UNIT OF A VEHICLE, A VEHICLE HAVING SAME, AND A METHOD OF CONTROLLING A VEHICLE

CROSS-REFERENCE TO RELATED APPLICATION

This application claims the benefit of priority to Korean Patent Application No. 10-2017-0106145, filed on Aug. 22, 2017 in the Korean Intellectual Property Office, the entire disclosure of which is incorporated herein by reference.

BACKGROUND

1. Field

The present disclosure relates to a head unit of a vehicle capable of interworking with a mobile device, a vehicle having the head unit, and a method of controlling the vehicle.

2. Description of the Related Art

Recently, in addition to the transport function, vehicles are used as a space to provide users with various services, such as listening to music, listening to radio, a call service, watching movies/TV, a navigation service, a traffic and weather information providing service, and the like.

In other words, vehicles have evolved into infotainment systems that fulfill an information function by providing a user with necessary information and an entertainment function by providing audio and video entertainment.

A vehicle as an infotainment system is connected to an external terminal such as a user's mobile terminal to provide a service provided from the external terminal. Typically, a vehicle is connected to an external terminal through an auxiliary (AUX) cable to receive audio signals from the external terminal. However, a vehicle can now be connected to a mobile terminal through a USB cable or wireless communication, thereby interworking with the mobile terminal.

SUMMARY

Therefore, it is an aspect of the present disclosure to provide a head unit of a vehicle capable of defining a policy about the conversion of an interworking means between the vehicle and a mobile device. It is another aspect of the present disclosure to provide a head unit of a vehicle capable of controlling the conversion of the interworking means according to the defined policy to thereby minimize a delay generated upon conversion. The head unit may also be configured to provide a service without interruption. Another aspect of the present disclosure is to provide a vehicle including the head unit and a method of controlling the vehicle.

Additional aspects of the disclosure will be set forth in part in the description which follows, in part, will be understood from the description, or may be learned by practice of the disclosure.

In accordance with one aspect of the present disclosure, a head unit of a vehicle interworking with a mobile device comprises: a communication interface including a wired communication module and a wireless communication module; a display configured to display an image corresponding to a video signal transmitted from the mobile device through the communication interface; and a controller configured to determine, if a new interworking request is received when the head unit interworks with the mobile device, whether the interworking with the mobile terminal is wired interworking through the wired communication module or wireless interworking through the wireless communication module. The controller is also configured to determine whether to allow or disallow the new interworking request according to the determination.

If the new interworking request is received by the wired communication module when the head unit interworks wirelessly with the mobile device through the wireless communication module, the controller may allow the new interworking request.

If the new interworking request is received from another mobile device when the head unit interworks wirelessly with the mobile device through the wireless communication module, the controller may disallow the new interworking request.

If the new interworking request is received from another mobile device when the head unit interworks with the mobile device in a wired manner through the wired communication module, the controller may disallow the new interworking request.

If the new interworking request from the other mobile device is received by the wired communication module, the controller may allow charging of the other mobile device.

If the interworking with the mobile device is converted from wireless interworking to wired interworking, the wired communication module may receive interworking conversion information from the mobile device, and may prepare execution of an application based on the received interworking conversion information.

The interworking conversion information may include at least one of authentication information of the mobile device and application state information of the mobile device.

If the interworking conversion information is received from the mobile device, the controller may skip an authentication procedure with the mobile device based on the authentication information included in the interworking conversion information.

If the interworking conversion information is received from the mobile device, the controller may successively execute operation of an application being executed before a conversion to wired interworking occurs, based on the application state information included in the interworking conversion information.

If the head unit interworks with the mobile device, the controller may process an audio signal and a video signal transmitted from the mobile device, may output the processed video signal to the display, and may output the processed audio signal to a speaker.

The head unit may further comprise a storage device configured to store audio setting information indicating an analog channel or a digital channel to which an audio signal transmitted from the mobile device is allocated.

The storage device may further store video setting information representing information about an encoding format of a video signal transmitted from the mobile device.

If the interworking with the mobile device is converted from wireless interworking to wired interworking, the controller may process an audio signal and a video signal transmitted from the mobile device, based on the stored audio setting information and the stored video setting information.

The wired communication module may include a Universal Serial Bus (USB) communication module. The wireless communication module may include a Wireless-Fidelity (Wi-Fi) communication module.

In accordance with another aspect of the present disclosure, a vehicle interworking with a mobile device comprises: a communication interface including a wired communication module and a wireless communication module; a display configured to display an image corresponding to a video signal transmitted from the mobile device through the communication interface; a speaker configured to output sound corresponding to an audio signal transmitted from the mobile device through the communication interface; and a controller configured to determine whether the interworking with the mobile device is wired interworking through the wired communication module or wireless interworking through the wireless communication module. The controller is further configured to determine whether to allow or disallow the new interworking request according to the determination.

If the new interworking request is received by the wired communication module when the vehicle interworks wirelessly with the mobile device through the wireless communication module, the controller may allow the new interworking request.

If the new interworking request is received from another mobile device when the vehicle interworks wirelessly with the mobile device through the wireless communication module, the controller may disallow the new interworking request.

If the new interworking request is received by the wireless communication module when the vehicle interworks with the mobile device in a wired manner through the wired communication module, the controller may disallow the new interworking request.

If the new interworking request from the other mobile device is received by the wired communication module, the controller may allow charging of the other mobile device.

If the interworking with the mobile device is converted from wireless interworking to wired interworking, the wired communication module may receive interworking conversion information from the mobile device and may prepare execution of an application based on the received interworking conversion information.

The interworking conversion information may include at least one of authentication information of the mobile device and application state information of the mobile device.

If the interworking conversion information is received from the mobile device, the controller may skip an authentication procedure with the mobile device based on the authentication information included in the interworking conversion information.

If the interworking conversion information is received from the mobile device, the controller may successively execute operation of an application being executed before conversion to wired interworking occurs based on the application state information included in the interworking conversion information.

If the vehicle interworks with the mobile device, the controller may process an audio signal and a video signal transmitted from the mobile device. The controller may further output the processed video signal to the display and may output the processed audio signal to the speaker.

The vehicle may further comprise a storage device configured to store audio setting information indicating an analog channel or a digital channel to which an audio signal transmitted from the mobile device is allocated.

The storage device may further store video setting information representing information about an encoding format of a video signal transmitted from the mobile device.

If the interworking with the mobile device is converted from wireless interworking to wired interworking, the controller may process an audio signal and a video signal transmitted from the mobile device, based on the stored audio setting information and the stored video setting information.

In accordance with another aspect of the present disclosure, a method of controlling a vehicle interworking with a mobile device comprises: determining, if a new interworking request is received when the vehicle interworks with the mobile device, whether the interworking with the mobile device is wired interworking or wireless interworking; determining, if it is determined that the interworking with the mobile device is wireless interworking, whether the new interworking request is received by a wired communication module or a wireless communication module; and allowing the new interworking request, if it is determined that the new interworking request is received by the wired communication module.

If the new interworking request is received from another mobile device when the vehicle interworks wirelessly with the mobile device, the controller may disallow the new interworking request.

If the new interworking request is received by a wireless communication module when the vehicle interworks with the mobile device in a wired manner, the controller may disallow the new interworking request.

BRIEF DESCRIPTION OF THE DRAWINGS

The above and/or other aspects of the disclosure will become apparent and more readily appreciated from the following description of the embodiments, taken in conjunction with the accompanying drawings of which:

FIG. 6 shows a table representing a policy about conversion of a connection method of a head unit according to an embodiment of the present disclosure.

DETAILED DESCRIPTION

Figure 1:
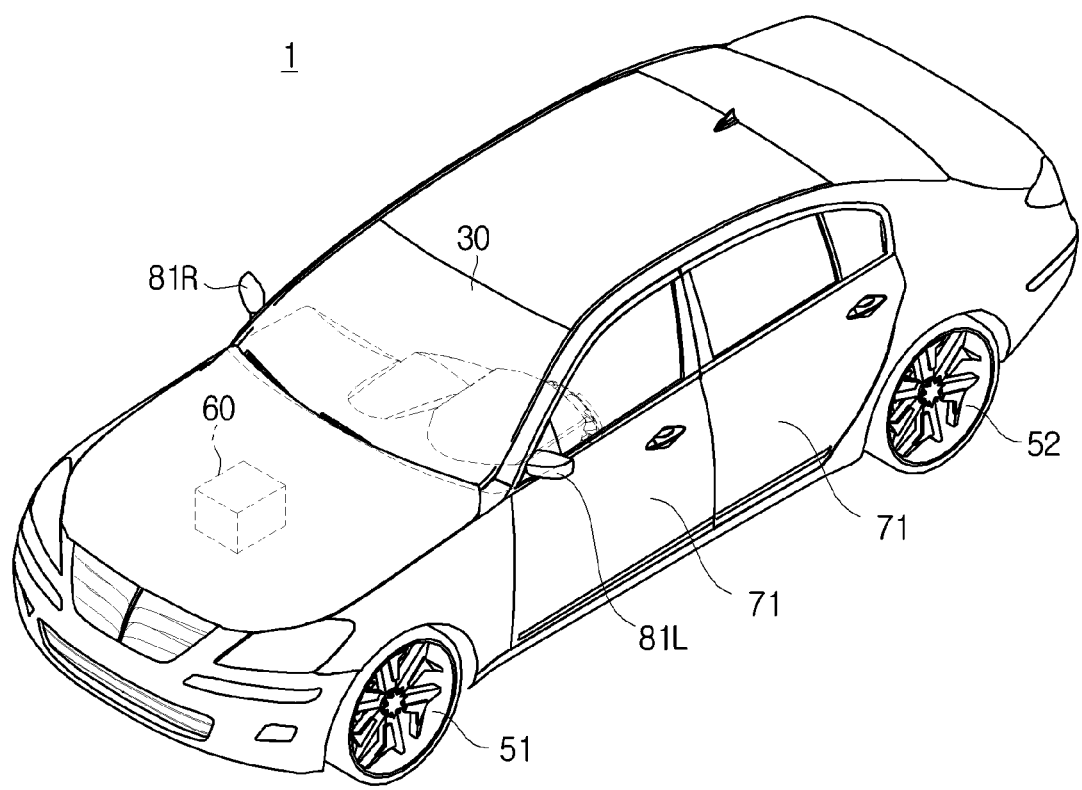
FIG. 1 shows an outer appearance of a vehicle according to an embodiment of the present disclosure.

Like reference numerals refer to like elements throughout this specification and in the drawings. This specification does not describe all components of the various embodiments. General information in the technical field to which the present disclosure belongs or overlapping information between the embodiments is also not described. The terms "portion", "module", "member", and "block", as used herein, may be implemented as software or hardware. According to the various embodiments, a plurality of "portions", "modules", "members", or "blocks" may be implemented as a single component. A single "portion", "module", "member", or "block" may include a plurality of components.

Throughout this specification, when a portion is "connected" to another portion, this includes the case in which the portion is indirectly connected to the other portion, as well as the case in which the portion is directly connected to the other portion. The indirect connection includes a connection through a wireless communication network.

Also, it is understood that the terms "includes," "comprises," "including," and/or "comprising," when used in this specification, specify the presence of a stated component but do not preclude the presence or addition of one or more other components.

It is to be understood that the singular forms "a," "an," and "the" include plural referents unless the context clearly dictates otherwise.

Reference numerals used in operations are provided for convenience of description, without describing the order of the operations. The operations can be executed in a different order from the stated order unless a specific order is definitely specified in the context.

Hereinafter, embodiments of a head unit of a vehicle, a vehicle including the head unit, and a method of controlling the vehicle are described in detail with reference to the accompanying drawings.

Figure 2:
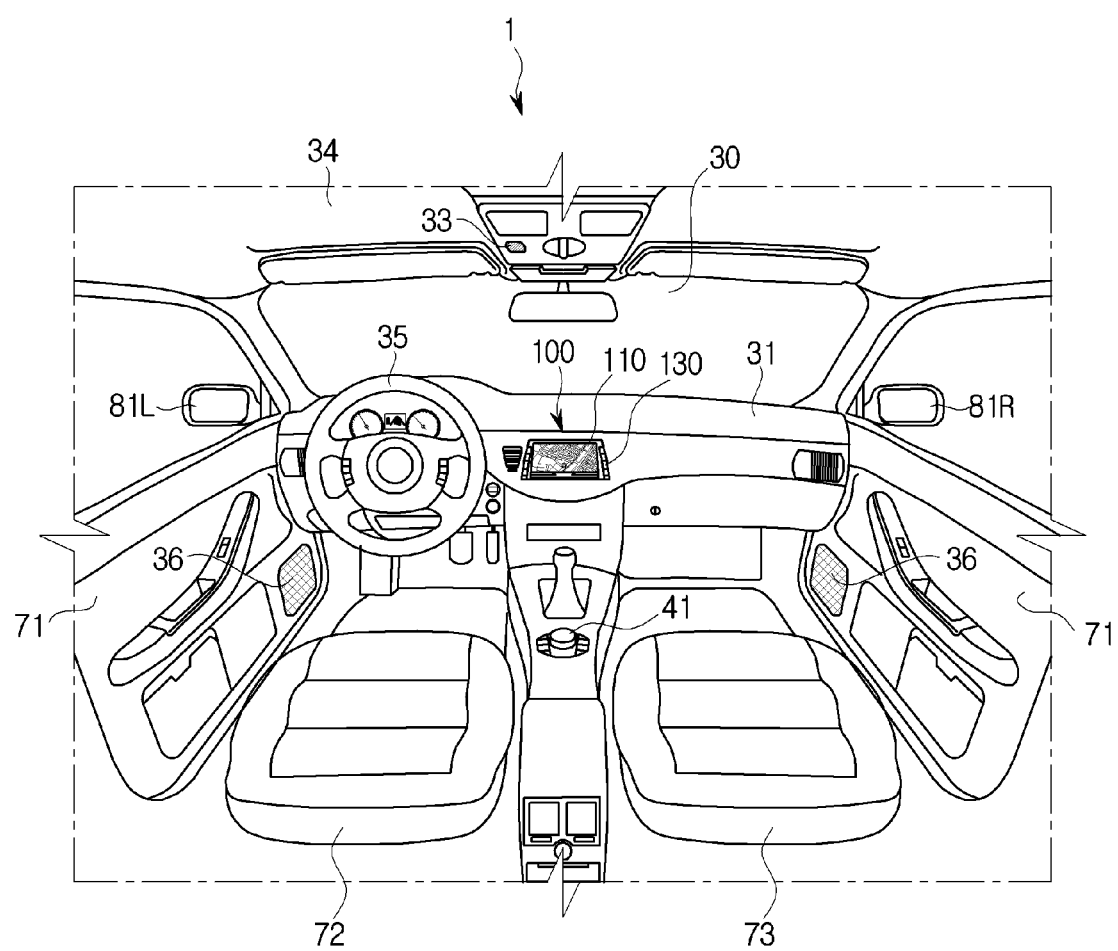
FIG. 2 shows an internal configuration and a head unit of a vehicle according to an embodiment of the present disclosure.
Figure 3:
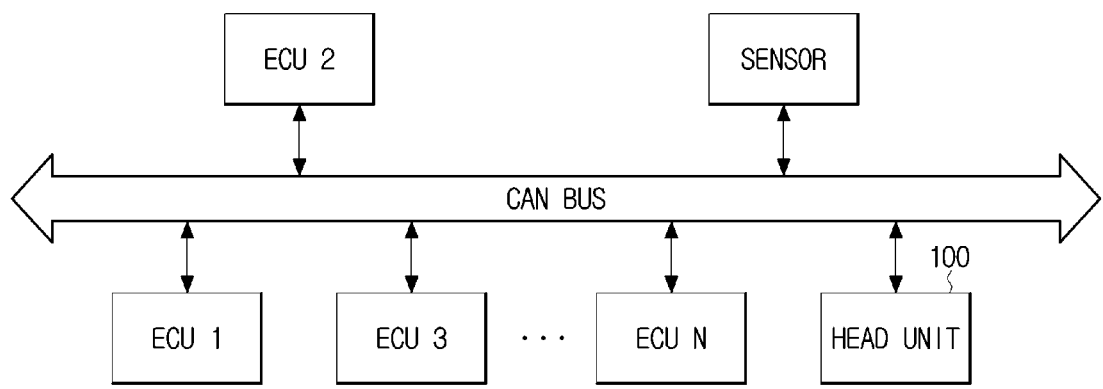
FIG. 3 schematically shows connections between units included in a vehicle.

FIG. 1 shows an outer appearance of a vehicle according to an embodiment of the present disclosure. FIG. 2 shows an internal configuration and a head unit of a vehicle according to an embodiment of the present disclosure. FIG. 3 schematically shows connections between units included in a vehicle.

Referring to FIG. 1, a vehicle 1 may include a plurality of wheels 51 and 52 (front wheels 51 and rear wheels 52) to move the vehicle 1, a plurality of doors 71 to shield the inside of the vehicle 1 from the outside, a front glass 30 to provide a driver with a front view of the vehicle 1, and a plurality of side view mirrors 81L and 81R to provide the driver with side and rear views of the vehicle 1.

A driving apparatus 60 installed in the vehicle 1 may provide a rotational force to the front wheels 51 or the rear wheels 52 to move the vehicle 1.

If the vehicle 1 is a front wheel driving type, the driving apparatus 60 may provide a rotational force to the front wheels 51. If the vehicle 1 is a rear wheel driving type, the driving apparatus 60 may provide a rotational force to the rear wheels 52. Also, if the vehicle 1 is a four-wheeled driving type, the vehicle 1 may provide a rotational force to all of the front and rear wheels 51 and 52.

The driving apparatus 60 may adopt an engine to burn fossil fuel to produce a rotational force, or a motor to receive power from a condenser (not shown) to produce a rotational force. Also, the driving apparatus 60 may adopt a hybrid type including both an engine and a motor to selectively use one of them.

Also, the vehicle 1 may include sensors, such as a proximity sensor to sense an obstacle or another vehicle around the vehicle 1, a rain sensor to determine if it rains and to sense an amount of rainfall, a speed sensor to sense speed of the vehicle 1, a Revolution Per Minute (RPM) sensor to sense RPM, and a position sensor to sense a current position of the vehicle 1 by receiving GPS signals.

Referring to FIG. 2, a head unit 100 may be located in a center fascia that is the center area of a dashboard 31 inside the vehicle 1. The head unit 100 may process and output audio signals and video signals. A navigation module may be installed in the head unit 100 to perform a navigation function. Accordingly, the head unit 100 may also be called an Audio Video Navigation (AVN) system. However, the head unit 100 according to an embodiment of the present disclosure is not limited to the AVN system, and may be any other apparatus that can process and output audio signals and video signals.

The head unit 100 may include a display 110 to display information, i.e., screens required for performing an audio function, a video function, a navigation function or a call function, or screens required for performing a function for interworking with a mobile device, which is described below. The head unit may also include an input device 130 to receive control commands from a user.

The display 110 may be implemented as one of various displays, such as a Liquid Crystal Display (LCD), a Light Emitting Diode (LED) display, a Plasma Display Panel (PDP) display, an Organic Light Emitting Diode (OLED) display, and a Cathode Ray Tube (CRT) display.

The input device 130 may be implemented as a button type device or a touch pad around the display 110. Alternatively, the input device 130 may be disposed in the form of a touch pad on the front surface of the display 110 to constitute a touch screen.

Also, a control command input through another input device provided in the vehicle 1, such as a button disposed in a steering wheel 35 or a jog shuttle 41 disposed between a driver seat 72 and a passenger seat 73, may be an input of the head unit 100.

Also, inside the vehicle 1, a microphone 33 may be provided to receive the user's voice. The user's voice may be used to execute the call function and then be transmitted to the called party. The user's voice may be recognized to execute various voice recognition-based applications.

In order to receive the user's voice effectively, the microphone 33 may be mounted on a headlining 34, as shown in FIG. 2. However, the microphone 33 may be mounted on the dashboard 31 or the steering wheel 35. In other words, the microphone 33 may be positioned at any location at which it can receive the user's voice properly.

Also, inside the vehicle 1, at least one speaker 36 may be provided to output audio. For example, the speaker 36 may be installed in the doors 71.

The speaker 36 may be connected to the head unit 100 to output sound for guiding a navigation route, a warning sound, audio included in multimedia contents, a voice for providing the user's desired information or service, a voice generated as a response to the users utterance, and the like.

The vehicle 1 may include, in addition to the head unit 100, modules for performing various functions such as an Engine Control Module (ECM), a Body Control Module (BCM), a Transmission Control Module (TCM), an Anti-lock Brake Control Module, a door control module, an airbag control module, etc.

Each of the modules may include an Electronic Control Unit (ECU) to control the module and acquire data required for controlling the module from various sensors provided in the vehicle 1.

A plurality of ECUs and sensors may transmit/receive signals to/from each other through an in-vehicle communication protocol. The in-vehicle communication protocol may be at least one of a Controller Area Network (CAN), a Local Interconnection Network (LIN), FlexRay, and Ethernet.

For example, as shown in FIG. 3, a plurality of units ECU 1, ECU 2, ECU 3, . . . , ECU N, the head unit 100 and a sensor may transmit/receive signals to/from each other using CAN communication. Each unit may transmit a CAN signal through a CAN bus or request a desired CAN signal through the CAN bus. Each unit may function as a node in CAN communication. A CAN signal may be transmitted in the form of a message.

Also, the CAN communication, the LIN communication and the Ethernet may be combined appropriately according to kinds of transmission or reception signals or according to the types of units that transmit or receive signals.

Figure 4:
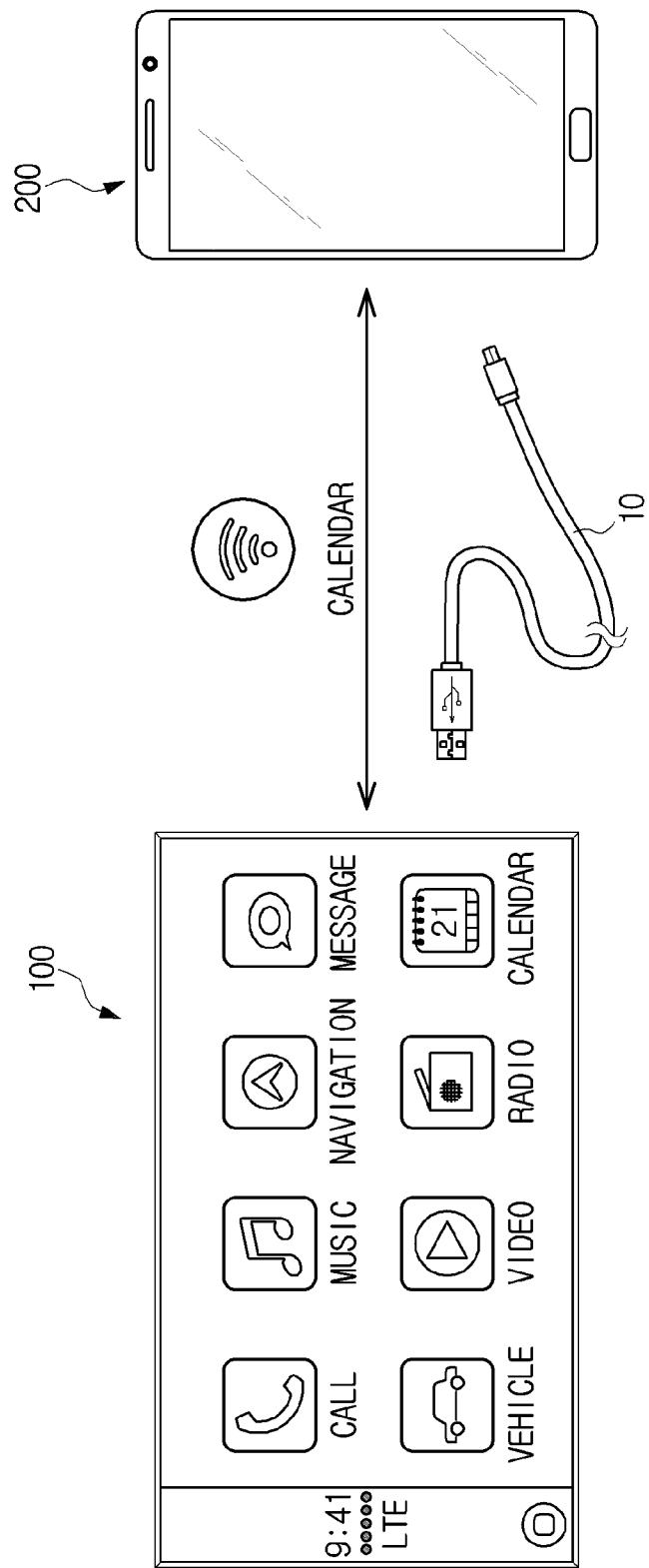
FIG. 4 shows an example of a screen displayed when a head unit of a vehicle interworks with a mobile device according to an embodiment of the present disclosure.
Figure 5:
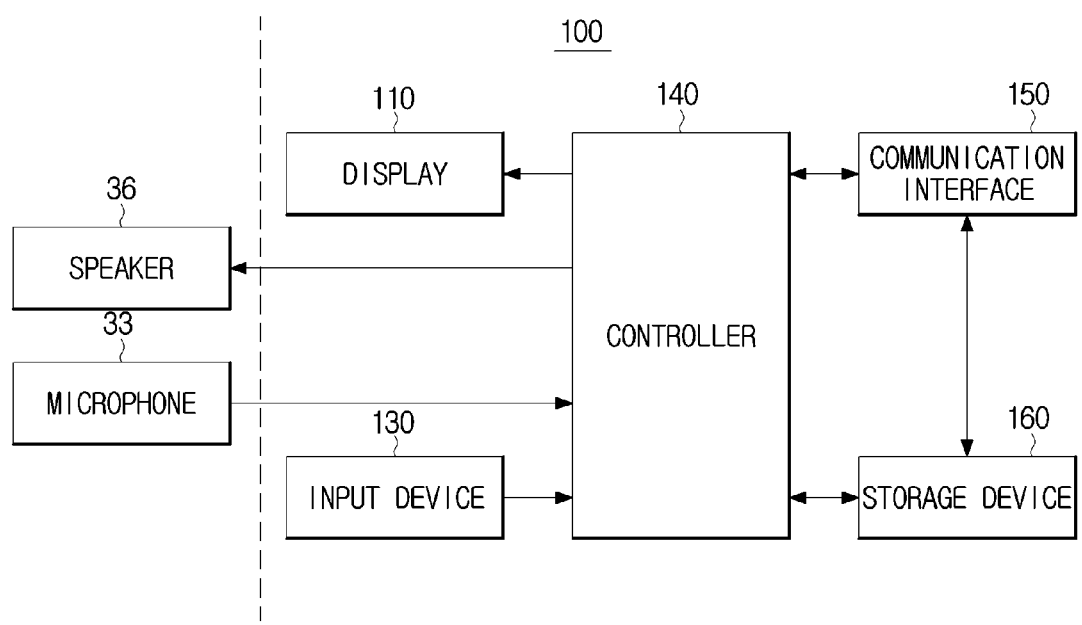
FIG. 5 shows a control block diagram of a head unit according to an embodiment of the present disclosure.

FIG. 4 shows an example of a screen displayed when a head unit of a vehicle interworks with a mobile device according to an embodiment of the present disclosure. FIG. 5 is a control block diagram of a head unit according to an embodiment of the present disclosure.

Referring to FIG. 4, the vehicle 1 according to an embodiment of the present disclosure may interwork with an external terminal such as a mobile device 200 through a wireless connection or a wired connection to receive various services that are executed on the external terminal. For example, when the vehicle 1 is connected to the mobile device 200 in a wireless fashion, the vehicle 1 may use Wi-Fi communication. When the vehicle 1 is connected to the mobile device 200 in a wired fashion, the vehicle 1 may use a Universal Serial Bus (USB) cable 10.

The mobile device 200 may include electronic devices, such as Personal Digital Assistant (PDA), a laptop computer, a tablet PC, a mobile phone, and a wearable device (for example, smart glasses or a smart watch). However, the mobile device 200 is not limited to the above-mentioned examples. The mobile 200 may be any electronic device that can ensure mobility, execute various applications, and be connected to the vehicle 1 in a wireless or wired fashion to transmit signals to the vehicle 1.

In the mobile device 200, a vehicle interworking application may be installed to interwork with the vehicle 1. The application may be provided from a manufacturer of the mobile device 200 or from an Operating System (OS) supplier of the mobile device 200.

Also, manufacturers may provide different kinds of applications. In the current embodiment, the kind of the application that is installed in the mobile device 200 is not limited.

In the current embodiment, the meaning that the vehicle 1 interworks with the mobile device 200 may include a case in which a screen corresponding to a video signal transmitted from the mobile device 200 is output to the display 110 of the vehicle 1. The meaning that the vehicle 1 interworks with the mobile device 200 may also include a case in which the sound corresponding to an audio signal transmitted from the mobile device 200 is output to the speaker 36 of the vehicle 1. The meaning that the vehicle 1 interworks with the mobile device 200 may also include a case in which the user's command input through the input device 130 or 41 of the vehicle 1 or the microphone 33 is transmitted to the mobile device 200 so that the mobile device 200 generates an audio/video signal according to the user's command and transmits the audio/video signal to the vehicle 1. The meaning that the vehicle 1 interworks with the mobile device 200 may further include a case in which the vehicle 1 is connected to the mobile device 200 through a cable or wireless communication. In other words, when the vehicle 1 interworks with the mobile device 200, a service provided by the mobile device 200 can be output through the vehicle 1.

For interworking between the vehicle 1 and the mobile device 200, an interworking application or an interworking program may be installed in the vehicle 1 and the mobile device 200. If the interworking application is executed on the vehicle 1 and the mobile device 200, the vehicle 1 may interwork with the mobile device 200, so that applications of the mobile device 200 can be executed on the vehicle 1.

Also, as shown in FIG. 4, a screen for enabling a user to select an application executed on the mobile device 200, such as a call application, a music playback application, a navigation application, texting, a radio application, and a calendar application, may be displayed.

Interworking between the vehicle 1 and the mobile device 200 is also called projection, mirroring, etc. In other words, interworking between the vehicle 1 and the mobile device 200 can be called any other term as long as it can perform the following operations.

The head unit 100 of the vehicle 1 may be connected to the mobile device 200 through a wireless connection or a wired connection. Accordingly, if the mobile device 200 is connected to the vehicle 1, applications, such as a call application, a music playback application, a navigation application, texting, and a radio application, which are executed on the mobile device 200, can be executed on the head unit 100 of the vehicle 1.

In order to execute the applications on the head unit 100 of the vehicle 1, the mobile device 200 may transmit an audio signal and a video signal to the head unit 100. The head unit 100 may process the audio signal and the video signal to output the results of the processing through the display 110 mounted on the head unit 100 and the speaker 36 installed in the vehicle 1.

Referring to FIG. 5, the head unit 100 may include a communication interface 150 to connect the mobile device 200 to the head unit 100, a controller 140 to process signals transmitted from the mobile device 200, a display 110 to visually output signals processed by the controller 140, and an input device 130 to receive a user's commands. The head unit 100 may further include a storage device 160 to temporarily or non-temporarily store information required for the control of the head unit 100 or for interworking with the mobile device 200.

The communication interface 150 may include a wired communication module to connect to the mobile device 200 in a wired fashion. The communication interface 150 may also include a wireless communication module to connect to the mobile device 200 in a wireless fashion. The wired communication module may include a USB communication module 151. The wireless communication module may include a Wi-Fi communication module 152 and a Bluetooth communication module 153 (see FIG. 8).

Also, the communication interface 150 may further include an internal communication module 154 (see FIG. 8) to communicate with other internal ECUs or sensors. The internal communication module 154 may adopt at least one of the above-mentioned communication protocols, such as CAN communication, LIN communication, Ethernet, FlexRay, etc. For example, if the internal communication module 154 adopts a CAN communication protocol, the internal communication module 154 may include a CAN controller to generate a CAN signal and a CAN driver. The CAN driver may be used to transmit the CAN signal to a CAN bus or to receive a CAN signal from the CAN bus.

The controller 140 may include a memory in which programs for performing operations which are described below are stored. The controller 140 may also include a processor for executing the stored programs. The controller 140 may include at least one memory and at least one processor. The memory and the processor may be integrated into one chip or physically separated from each other.

Also, the storage device 160 may include at least one memory. The controller 140 may share the memory with the storage device 160 or use a separate memory from the storage device 160.

If the mobile device 200 is connected to the head unit 100 in a wireless or wired fashion and interworks with the head unit 100 through a series of authentication processes which are described below, the controller 140 may display kinds of services or applications provided from the mobile device 200 on the display 110.

In the following embodiment, a case in which the mobile device 200 interworks with the head unit 100 through a wireless connection is referred to as wireless interworking and a case in which the mobile device 200 interworks with the head unit 100 through a wired connection is referred to as wired interworking.

If a user selects a desired service or application through the input device 130 or the microphone 33, the controller 140 may transmit a request signal for requesting the selected service or application to the mobile device 200 through the communication interface 150.

If the mobile device 200 transmits an audio/video signal for executing the selected service or application to the controller 140, according to the request signal, the controller 140 may process the audio/video signal and output the result of the processing to the display 110 and the speaker 36.

Since wired interworking and wireless interworking between the head unit 100 and the mobile device 200 are possible, there may be a case in which a connection method or a connection interface is converted from wired to wireless or from wireless to wired. For example, there may be a case in which, when the mobile device 200 is connected wirelessly to the head unit 100, the battery of the mobile device 200 needs to be charged. In this case, a connection method may be converted from wireless to wired. Also, there may be a case in which, when the mobile device 200 is connected to the head unit 100 in a wired manner, the mobile device 200 needs to be moved. In this case, a connection method may be converted from wired to wireless.

When a connection method is converted, a delay may occur according to the connection characteristics. Particularly, when a wireless connection is in poor condition, the delay time may increase sharply. Also, when an interface is initialized, and an authentication procedure is again performed, a service may be interrupted. Also, while a connection method is converted, a distraction may occur due to a flickering screen or resetting of a navigation destination.

According to an embodiment of the present disclosure, the head unit 100 may define a policy about the conversion of a connection method. The head unit 100 may limit the cases in which the conversion of a connection method is possible, according to the defined policy, thereby preventing an increase of the delay time. Also, in the case in which the conversion of a connection method is allowed, the head unit 100 may store information in advance that is required for providing a seamless service to thereby prevent a service interruption.

If a new interworking request is received when the head unit 100 interworks with the mobile device 200, the controller 140 may determine whether the interworking with the mobile device 200 is wired interworking through the wired communication module or wireless interworking through the wireless communication module. The controller 140 may then determine whether to allow or disallow the new interworking request according to the result of the determination.

For example, if a USB cable 10 (shown in FIG. 4) connected to the mobile device 200 is inserted into a USB port provided in the vehicle 1, or if a connection request (for example, a Wi-Fi connection request or a Bluetooth connection request) from the mobile device 200 is transmitted to the wireless communication module, the controller 140 may determine that a new interworking request is received.

Hereinafter, a policy about conversion of a connection method is described in detail. In the current embodiment, conversion of a connection method means the conversion of a connection method for interworking between the vehicle 1 and the mobile device 200. In this specification, a "connection method" and an "interworking method" are used without distinction.

FIG. 6 is a table representing a policy about the conversion of a connection method of a head unit according to an embodiment of the present disclosure.

Referring to FIG. 6, the head unit 100 may allow interworking if a new interworking request, such as a wired interworking request or a wireless interworking request, is received from the mobile device 200 when the head unit 100 does not interwork with the mobile device 200 in a wired or wireless manner or fashion.

In one example, a wireless interworking request is received from the mobile device 200 connected to the head unit 100 in a wired manner when the head unit 100 interworks with the mobile device 200 in a wired manner. In this example, if a new interworking request is received by the wireless communication module, the head unit 100 may maintain the wired interworking and disallow the wireless interworking request. The head unit 100 may determine whether or not the mobile device 200 is the mobile device 200 already connected to the head unit 100, based on identification (ID) information received from the mobile device 200.

Also, if a wireless interworking request is received from another mobile device when the head unit 100 interworks with the mobile device 200 in a wired manner, the head unit 100 may maintain wired interworking with the mobile device 200 and disallow the wireless interworking request.

In another example, a wired interworking request is received from the mobile device 200 connected wirelessly to the head unit 100 when the head unit 100 interworks wirelessly with the mobile device 200. In this example, if a new interworking request is received by the wired communication module, the head unit 100 may allow conversion from wireless interworking to wired interworking. The head unit 100 may then block or maintain an existing wireless Wi-Fi connection.

Since a wireless interface may have low reliability of data transmission due to various interferences that may be generated in driving situations, the head unit 100 may allow conversion from wireless interworking to wired interworking. Also, since the head unit 100 and the mobile device 200 generate interworking conversion information for conversion from wireless interworking to wired interworking, it is possible to provide a seamless service even when a connection method is converted.

Also, if a wired connection is requested from another mobile device when the head unit 100 interworks wirelessly with the mobile device 200, the head unit 100 may maintain the wireless interworking with the mobile device 200. Additionally, the head unit 100 may disallow the wired interworking with the other mobile device. Thereby, the head unit 100 can prevent the service from being interrupted. The wired connection may be requested for charging the battery of the other mobile device. Although the other mobile terminal does not interwork with the head unit 100, the battery of the other mobile device may be charged through a USB cable.

The policy about conversion of the connection method according to the above-described table may be stored in the storage device 160. The controller 140 may control conversion of an interworking method between the head unit 100 and the mobile device 200 according to the stored policy.

Operations for individual cases defined in the above-described table are described in detail below.

If the USB cable 10 connected to the mobile device 200 is inserted into the USB port provided in the vehicle 1 or if a connection request from the mobile device 200 is received by the Bluetooth communication module 153 or the Wi-Fi communication module 152, the controller 140 may determine whether the head unit 100 currently interworks with the mobile device 200.

If the controller 140 determines that the head unit 100 does not interwork with the mobile device 200, the controller 140 may allow interworking between the head unit 100 and the mobile device 200.

Figure 7:
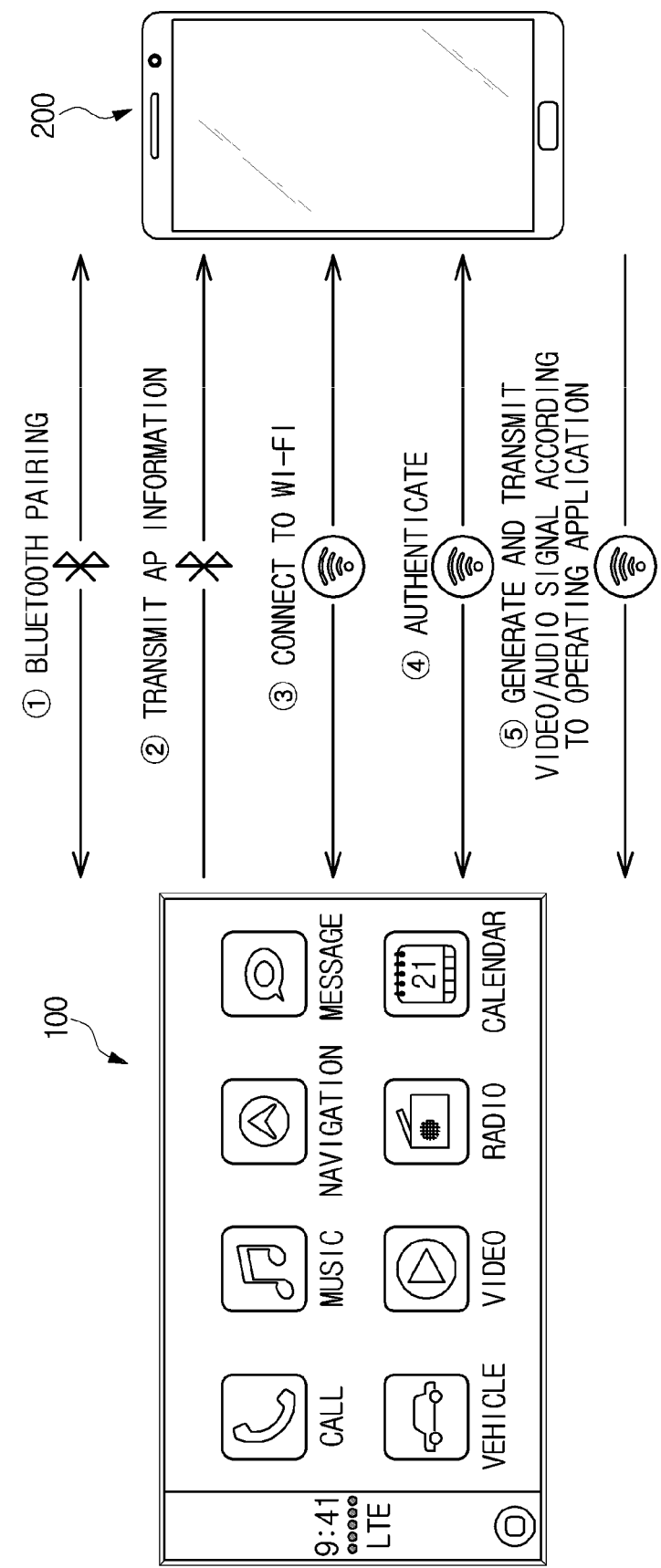
FIG. 7 shows a view illustrating a wireless connection process that is performed between a head unit and a mobile device, according to an embodiment of the present disclosure.

FIG. 7 is a view describing a wireless connection process that is performed between a head unit and a mobile device, according to an embodiment of the present disclosure.

When the head unit 100 is connected to the mobile device 200 through Wi-Fi communication, the head unit 100 may operate as an access point AP.

As shown in FIG. 7, before the head unit 100 is connected to the mobile device 200 through Wi-Fi, Bluetooth pairing may be performed (①). If the head unit 100 is connected to the mobile device 200 through the Bluetooth communication module 153 in such a way that the head unit 100 can transmit/receive signals to/from the mobile device 200, the controller 140 may transmit its own AP information to the mobile device 200 (②).

If the mobile device 200 requests a connection based on the received AP information, and the head unit 100 as an AP responds to the connection request, a Wi-Fi connection may be established between the head unit 100 and the mobile device 200 (③). In the current embodiment, a Bluetooth connection may be performed before a Wi-Fi connection in consideration of security. However, a Wi-Fi connection may be immediately established without a Bluetooth connection according to a design specification.

If the head unit 100 is connected to the mobile device 200 through Wi-Fi, an authentication procedure for interworking between the head unit 100 and the mobile device 200 may be performed (④). More specifically, the head unit 100 and the mobile device 200 may exchange certificates and generate and transfer encryption keys. According to authentication methods, any one of the head unit 100 and the mobile device 200 may generate and transfer an encryption key. Alternatively, both of the head unit 100 and the mobile device 200 may generate and transfer encryption keys. In the current embodiment, authentication methods are not limited.

If the authentication procedure for interworking is completed, the head unit 100 can interwork with the mobile device 200. The mobile device 200 may generate a video/audio signal according to an operating application, and transmit the video/audio signal to the head unit 100 through Wi-Fi communication (⑤).

Figure 8:
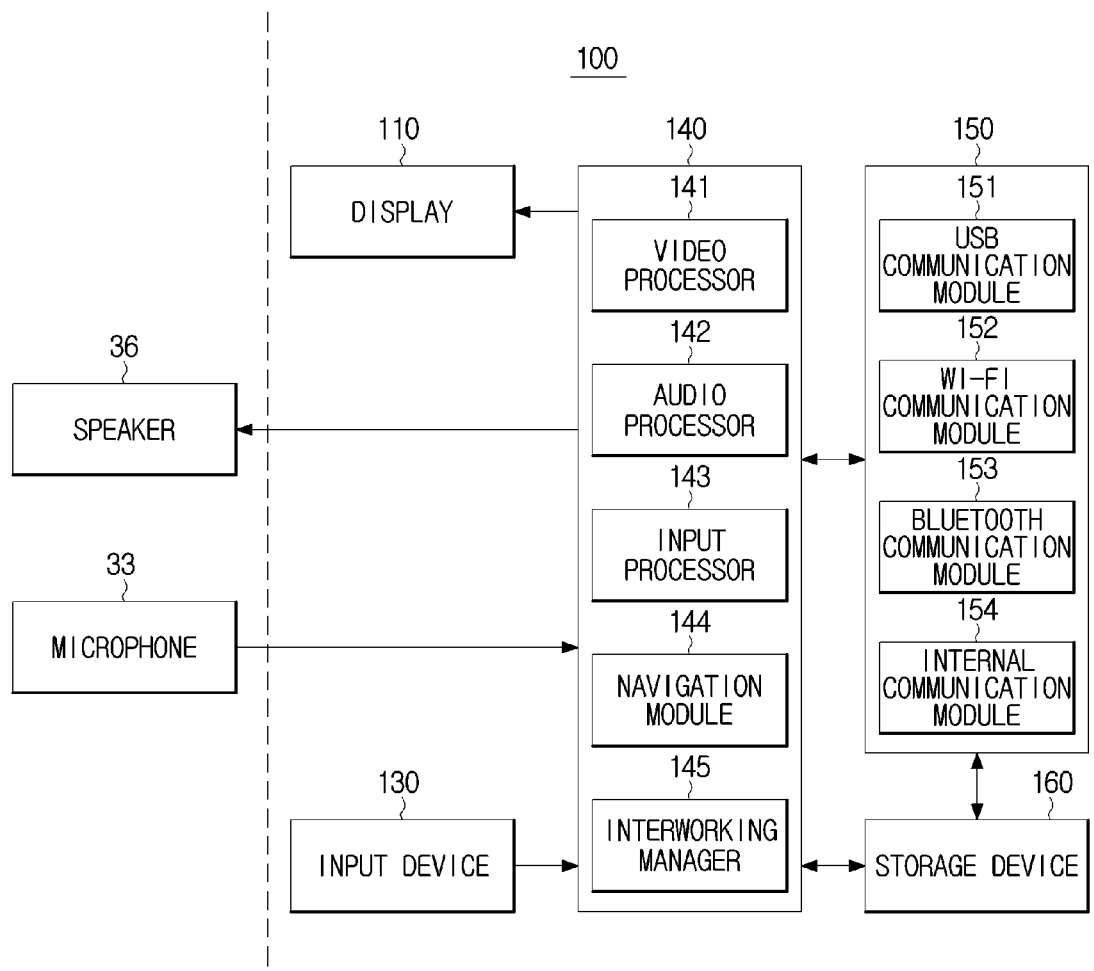
FIG. 8 shows a control block diagram illustrating a configuration of a controller of a head unit according to an embodiment of the present disclosure.
Figure 9:
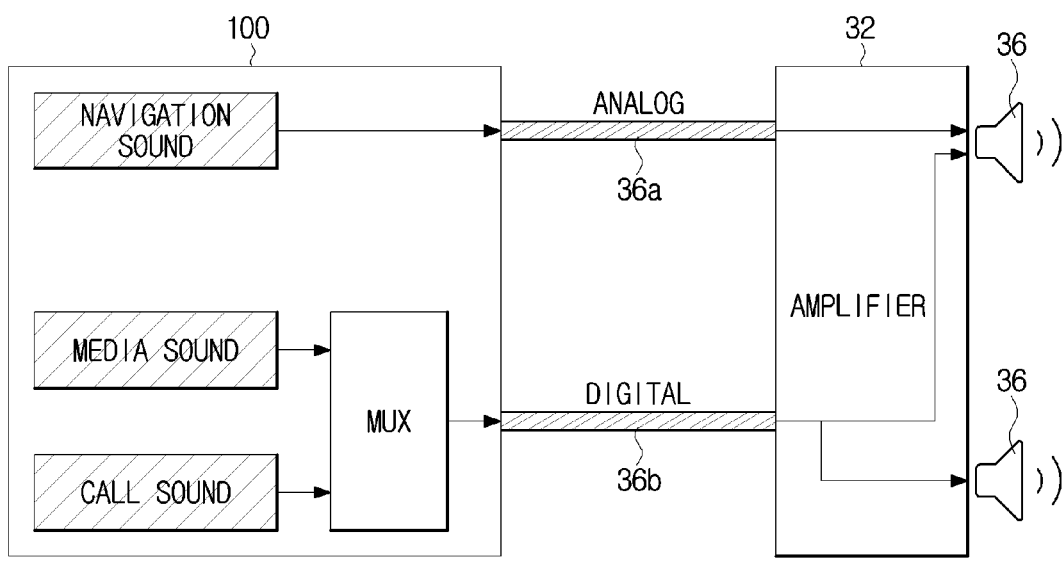
FIG. 9 schematically shows an example of channel allocation for an audio signal transmitted from a mobile device.

FIG. 8 is a control block diagram illustrating a configuration of a controller of a head unit according to an embodiment of the present disclosure. FIG. 9 is a view for describing an example of channel allocation for an audio signal transmitted from a mobile device.

Referring to FIG. 8, the controller 140 may include a video processor 141 to process video signals transmitted from the mobile device 200, and an audio processor 142 to process audio signals transmitted from the mobile device 200. The controller 140 may further include an input processor 143 to perform processing for transferring user commands input through the vehicle 1 to the mobile device 200.

Also, if the head unit 100 can itself perform a navigation function, the controller 140 may further include a navigation module 144.

Also, the controller 140 may further include an interworking manager 145 to perform control related to conversion of a connection method as described above.

The video processor 141 may decode and render a video signal transmitted from the mobile device 200 and output the resultant video signal to the display 110. For example, if the mobile device 200 transmits a video signal using an encoding (compression) standard such as H.264, a H.264 decoder included in the video processor 141 may decode the compressed video signal and output the decoded video signal to the display 110.

The display 110 may display a screen corresponding to the video signal received from the mobile device 200.

The audio processor 142 may include an audio decoder. The audio decoder may decode an audio signal transmitted from the mobile device 200. The audio decoder may also output the decoded audio signal to the speakers 36 provided in the vehicle 1.

The audio processor 142 may further include an audio encoder. The audio encoder may encode a user's voice input to the microphone 33 of the vehicle 1. and the audio encoder may also transmit the encoded user's voice to the mobile device 200 through the Wi-Fi communication module 152.

Referring to FIG. 9, the head unit 100 may be connected to the speaker 36 through a cable. For example, the cable may include an analog cable 36a and a digital cable 36b of a S/PDIF standard. The analog cable 36a may form an analog channel. The digital cable 36b may form a digital channel.

An amplifier 32 may be provided between the head unit 100 and the speaker 36. The amplifier 32 may amplify an audio signal transferred from the head unit 100. The amplifier 32 may also transfer the amplified audio signal to the speaker 36 disposed inside the vehicle 1. In the amplifier 32, a decoder may be installed to convert a digital signal to an analog signal.

If the head unit 100 is connected to the mobile device 200, the head unit 100 may have a negotiation with the mobile device 200 to select a channel to which an audio signal transmitted from the mobile device 200 is to be allocated from among the analog channel and the digital channel.

Referring to the example of FIG. 9, sounds such as a warning sound or a navigation sound including a route guide voice and an output when a navigation application is executed may be allocated to the analog channel. Media sound of multimedia contents such as music or moving pictures and call sound including a called party's voice may be allocated to the digital channel. Also, a sound related to voice recognition may be allocated to the analog channel.

Information indicating the digital/analog channel to which an audio signal transmitted from the mobile device 200 is allocated is referred to as audio setting information. The audio setting information may be stored in the storage device 160 and/or the mobile device 200.

Allocation of an audio channel may depend on an executed application. Also, information about applications whose sound is allocated to the digital channel or information about priorities between applications for the digital channel may be regularized and then stored as channel allocation rules. When the head unit 100 is connected to the mobile device 200, channel allocation may be performed based on an executed application and the stored channel allocation rules.

Also, when the head unit 100 is connected to the mobile device 200, the head unit 100 may have a negotiation with the mobile device 200 to decide a codec for decoding a video signal transmitted from the mobile device 200.

For example, if the mobile device 200 transmits information about formats of video signals to be transmitted to the head unit 100, the head unit 100 may decide decoders for decoding the video signals, based on formats that it can decode. The video signals may be distinguished independently or according to the kinds of applications related to the video signals.

Information about an encoding format of a video signal transmitted from the mobile device 200 is referred to as video setting information. The video setting information may be also stored in the storage device 160 and/or the mobile device 200.

Referring again to FIG. 8, the input processor 143 may generate a signal corresponding to a user command input through the vehicle 1. For example, a list of applications that can be executed on the mobile device 200 may be displayed on the display 110. If a user selects one of the displayed applications through the input device 130, the input processor 143 may generate a request signal for executing the selected application. Additionally, the input processor 143 may transmit the request signal to the mobile device 200 through the Wi-Fi communication module 152.

Also, if the user inputs a voice command through the microphone 33, the audio processor 142 may encode the user's voice as described above. Additionally, the audio processor 142 may transmit the user's voice to the mobile device 200. Alternatively, the controller 140 may also include a voice recognition engine to transmit the user's voice in the form of text to the mobile device 200.

As described above, the head unit 100 may transmit/receive information to/from other electronic devices or sensors of the vehicle 1 through an in-vehicle communication protocol such as CAN communication, LIN communication, etc. The head unit 100 may transmit information received from the other electronic devices or sensors of the vehicle 1 to the mobile device 200. For example, the head unit 100 may transmit vehicle state information, such as speed, RPM, residual fuel, fuel efficiency information, driving information, breakdown information, etc., to the mobile device 200.

Figure 10:
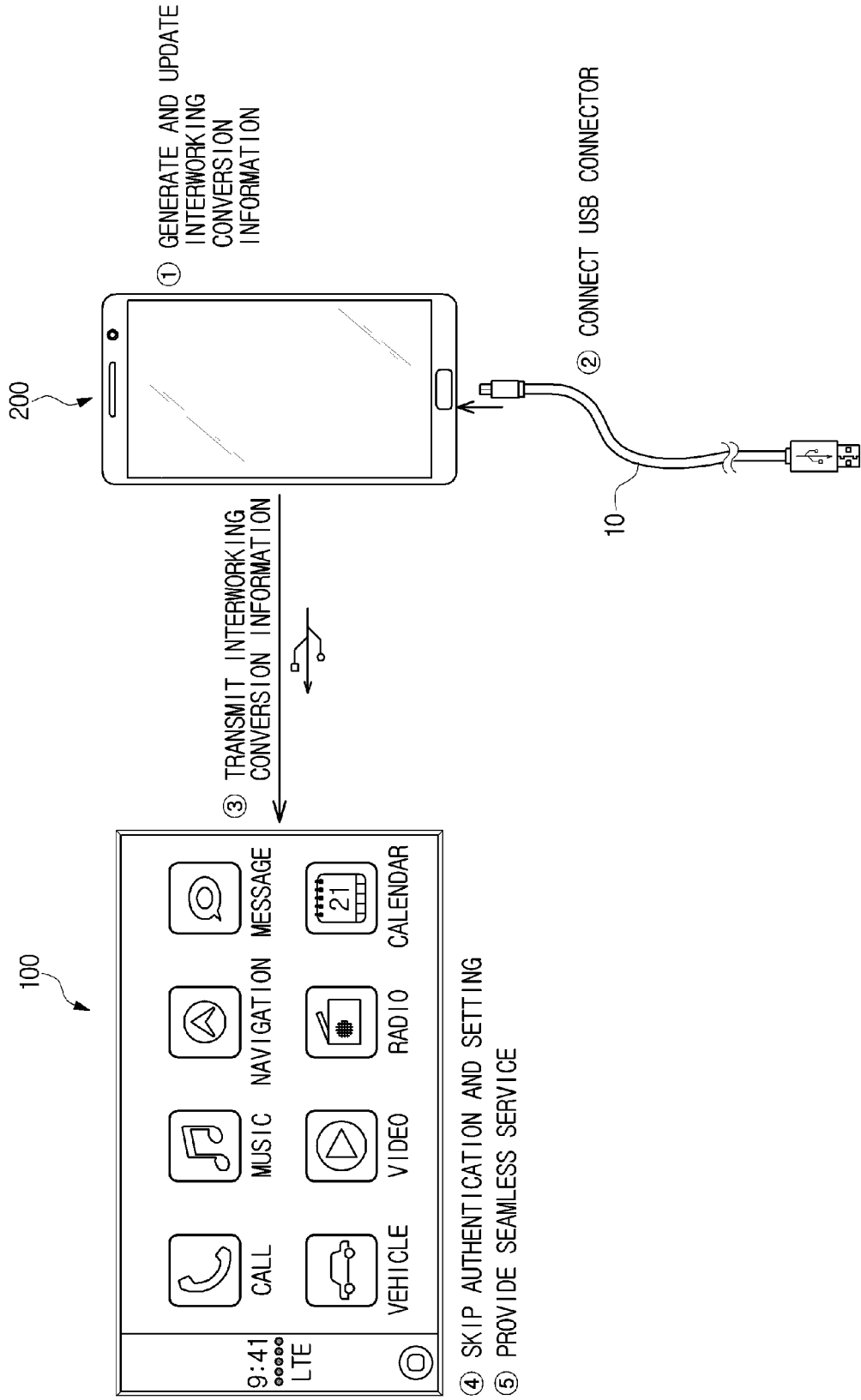
FIG. 10 shows a view in which a connection method between a head unit and a mobile device is converted from wireless to wired.

FIG. 10 is a view for describing a case in which a connection method between a head unit and a mobile device is converted from wireless to wired.

Referring to FIG. 10, the mobile device 200 connected wirelessly to the head unit 100 may generate interworking conversion information for conversion of an interworking method ((①)). The mobile device 200 may also update the interworking conversion information whenever the interworking conversion information changes.

The interworking conversion information may include authentication information, application state information, connection application information, vehicle state information, audio/video setting information, and the like.

The authentication information may include information about an encryption key generated when the head unit 100 is connected wirelessly to the mobile device 200.

The application state information may include information about a current state of an application. For example, in the case of a music playback application, information about a playlist, favorite music, currently playing music, and the like may be included in the application state information. Also, in the case of a call application, information about a phone book, a recent call list, or the like may be included in the application state information. Also, in the case of a navigation application, information about a current location, a departure point, a destination, traffic conditions, and the like may be included in the application state information.

If the USB cable 10 connected to the mobile device 200 is inserted into the USB port provided in the vehicle 1 ((②)), the controller 140 may allow wired interworking between the head unit 100 and the mobile device 200. In this example, the controller 140 may block wireless interworking. According to a design specification, the controller 140 may disconnect or maintain the Wi-Fi connection between the head unit 100 and the mobile device 200.

The mobile device 200 may transmit the interworking conversion information to the head unit 100 through the USB cable 10 ((③)). The head unit 100 may skip an authentication and setting process required when a wired connection is initially established, using the interworking conversion information ((④)). The head unit 100 may seamlessly provide a service provided in the wireless interworking state ((⑤)).

Figure 11:
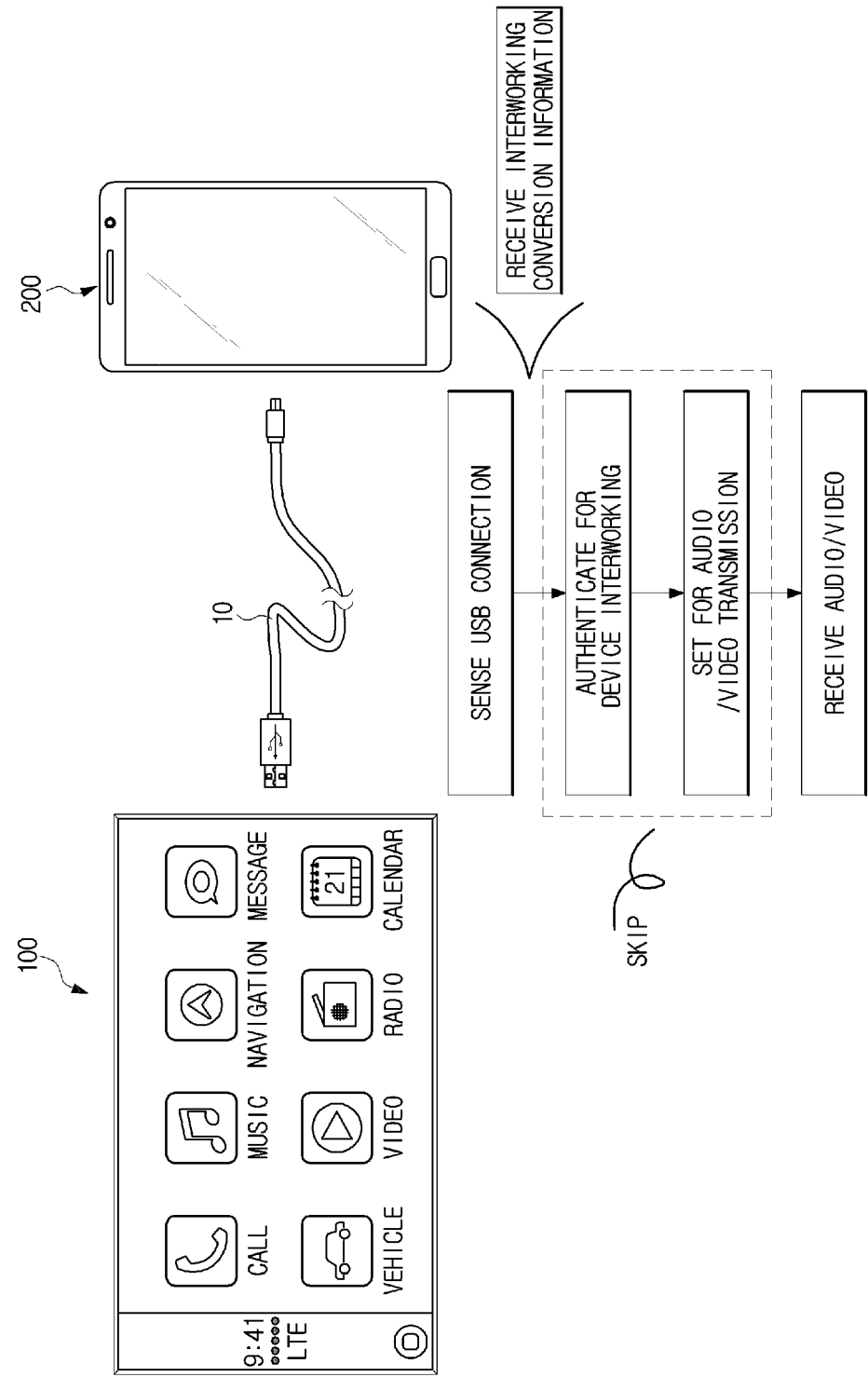
FIG. 11 shows a view in which an operation is performed when a head unit interworks with a mobile device in a wired manner.

FIG. 11 is a view describing an operation that is performed when a head unit interworks with a mobile device in a wired fashion.

Referring to FIG. 11, if the head unit 100 is connected to the mobile device 200 through the USB cable 10 in a wired manner, the head unit 100 and the mobile device 200 may sense a USB connection. In this example, the head unit 100 may perform an authentication procedure of exchanging certificates and generating and transferring encryption keys for interworking. If authentication is completed, an initial screen may be displayed and a previously executed application may be initialized.

However, if the head unit 100 and the mobile device 200 are converted from wireless interworking to wired interworking as shown in FIG. 10, interworking conversion information may be transmitted from the mobile device 200. In this example, the interworking conversion information may include authentication information of the mobile device 200. In other words, the authentication information used for wireless interworking may be used for conversion to wired interworking. For example, the controller 140 may determine whether an encryption key included in the interworking conversion information is identical to an encryption key of the mobile device 200 previously interworked in the wireless manner. Accordingly, the head unit 100 may skip a complicated authentication process of exchanging certificates and generating/transferring encryption keys and immediately interwork with the mobile device 200. Thus, a connection delay may be prevented.

Also, audio setting information and video setting information for the mobile device 200 may have been stored in the storage device 160. Alternatively, the interworking conversion information may include the audio setting information and the video setting information. Accordingly, no negotiation for the audio setting and video setting may be needed when wired interworking between the head unit 100 and the mobile device 200 is newly established. An audio signal and a video signal transmitted from the mobile device 200 may be processed based on the stored audio setting information and video setting information.

Also, the head unit 100 may prepare a previously executed service or application to start immediately, based on application state information included in the interworking conversion information. Thereby, the head unit 100 may successively execute operation of the application being executed before conversion to wired interworking occurs. Accordingly, a seamless service may be provided.

According to another embodiment, if conversion to another interworking method is allowed in addition to conversion from wireless interworking to wired interworking with respect to the same mobile device 200, the above-described operations related to the conversion of the interworking method may be performed.

Hereinafter, an embodiment of a vehicle control method is described. The vehicle control method according to an embodiment of the present disclosure may be applied to the vehicle 1, the head unit 100, and the mobile device 200 according to the above-described embodiments. Accordingly, the embodiments described above with reference to FIGS. 1-11 may be applied to the embodiment of the vehicle control method unless otherwise noted.

Figure 12:
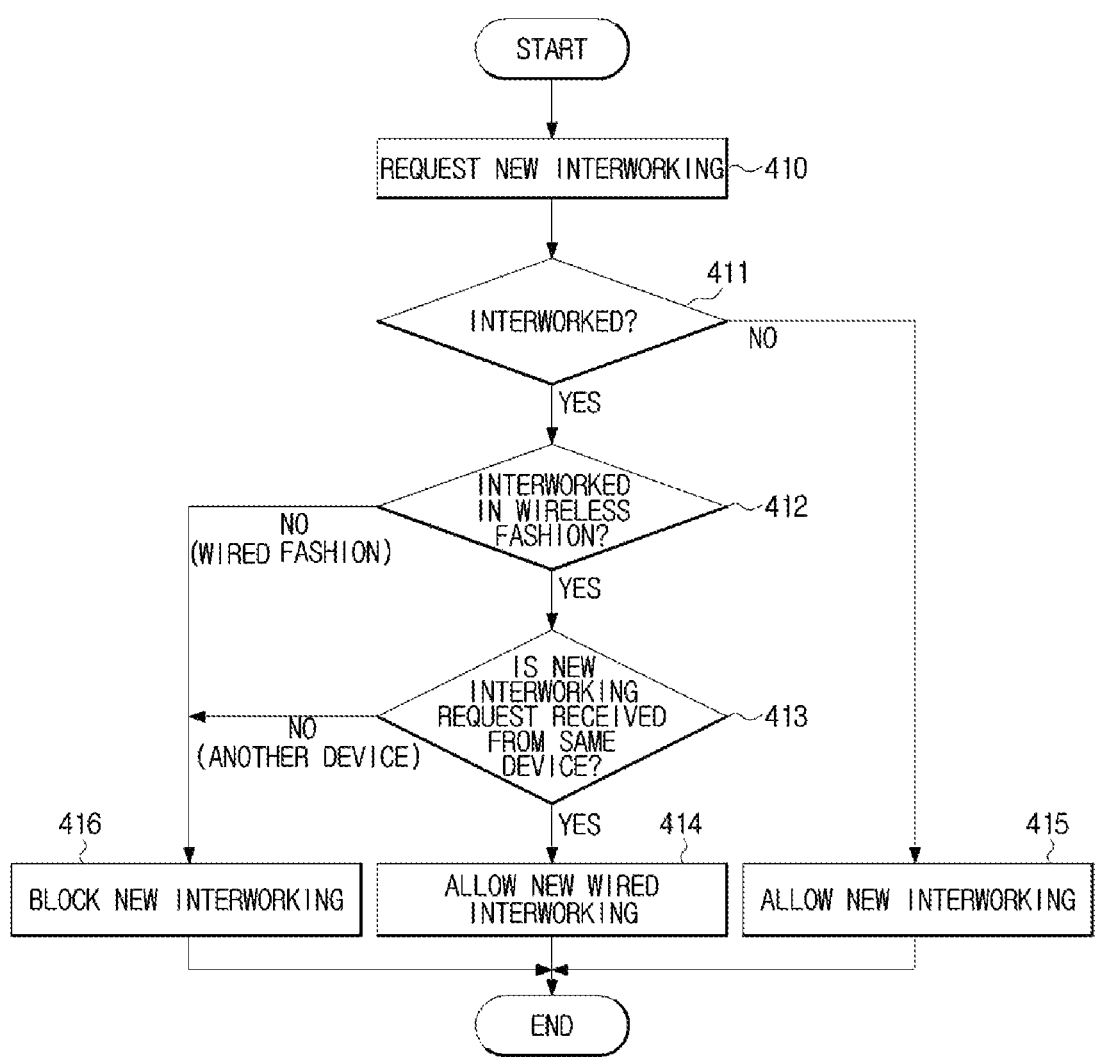
FIG. 12 shows a flowchart illustrating a vehicle control method according to an embodiment of the present disclosure.

FIG. 12 is a flowchart illustrating a vehicle control method according to an embodiment of the present disclosure.

Referring to FIG. 12, if a new interworking request is received in operation or step 410, the head unit 100 may determine whether the head unit 100 interworks with any mobile device in operation 411. If the head unit 100 determines that it does not interwork with any mobile device ("No" in operation 411), the head unit 100 may allow new interworking in operation 415. At this time, the head unit 100 may allow new interworking regardless of whether the new interworking request is a wired interworking request or a wireless interworking request.

If the head unit 100 determines that the head unit 100 interworks with a mobile device ("Yes" in operation 411), the head unit 100 may determine whether the head unit 100 interworks wirelessly with the mobile device in operation 412.

If the head unit 100 determines that the head unit 100 interworks with the mobile device in a wired manner ("No" in operation 412), the head unit 100 may block new interworking in operation 416. Thereby, the head unit 100 may prevent a service provided from the mobile device (for example, the mobile device 200) connected to the head unit 100 in a wired manner from being interrupted.

If the head unit 100 determines that the head unit 100 interworks wirelessly with the mobile device ("Yes" in operation 412), then, in operation 413, the head unit 100 may determine whether the new interworking request is received from the same mobile device (for example, the mobile device 200) with which the head unit 100 interworks. In this example, the mobile device 200 is connected through Wi-Fi and the other mobile device is connected through the USB cable 10. To determine whether the new interworking request is received from the same mobile device 200, the head unit 100 may compare an ID of the mobile device 200 with which the head unit 100 interworks to an ID of the other mobile device which transmitted the new interworking request.

If the head unit 100 determines that the new interworking request is not received from the same mobile device 200 with which the head unit 100 interworks ("No" in operation 413), the head unit 100 may disallow new interworking in operation 416. Since the head unit 100 blocks new interworking with another mobile device when the head unit 100 interworks with the mobile device 200, the head unit 100 can prevent a service from being interrupted. In this example, the other mobile device is not connected to the head unit 100. However, since the other mobile device may be requesting a connection for charging the battery, the battery of the other mobile device may be charged through the USB cable 10.

If the mobile device 200 interworking wirelessly with the head unit 100 requests new interworking, the new interworking may be a wired interworking. Accordingly, if the head unit 100 determines that the new interworking request is received from the same mobile device with which the head unit 100 interworks ("Yes" in operation 413), the head unit 100 may allow new wired interworking in operation 414. Wireless interworking may have low reliability of data transmission due to various interferences that may be generated in driving situations. Accordingly, when the head unit 100 interworks with the mobile device 200 in a wireless fashion, the head unit 100 may allow conversion to wired interworking with the same mobile device 200. Also, since the head unit 100 and the mobile device 200 generate interworking conversion information for conversion from wireless interworking to wired interworking, which is described below, a seamless service can be provided.

Figure 13:
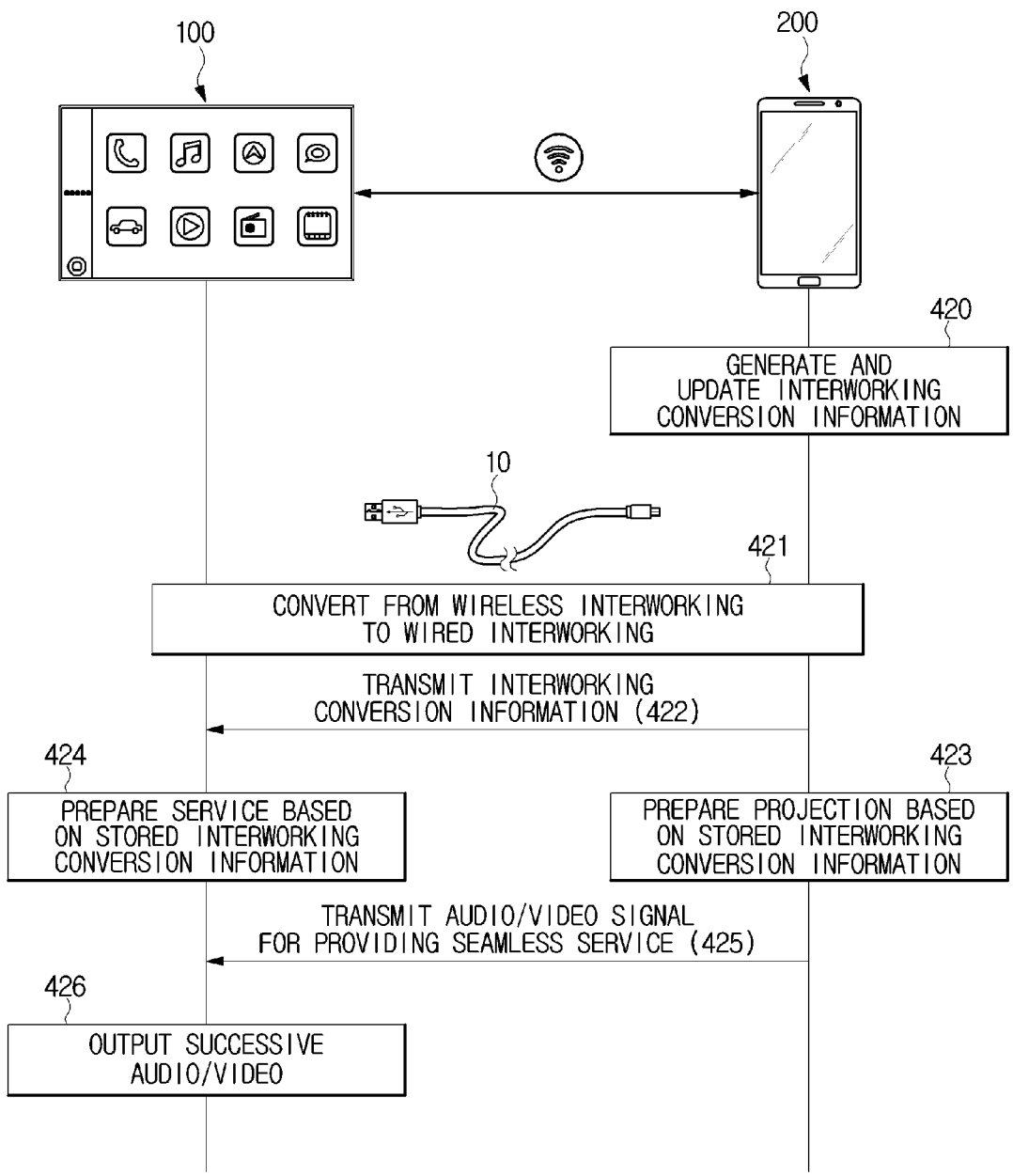
FIG. 13 is a flowchart illustrating an operation in which a head unit and a mobile device, interworked wirelessly with each other, perform the conversion of an interworking method, in a vehicle control method according to an embodiment of the present disclosure.

FIG. 13 is a flowchart illustrating an operation in which a head unit 100 and a mobile device 200, which are interworking wirelessly with each other, perform conversion of an interworking method in a vehicle control method according to an embodiment of the present disclosure.

Referring to FIG. 13, if the head unit 100 is connected to the mobile device 200 by wireless communication such as Wi-Fi, the mobile device 200 may generate interworking conversion information for conversion of an interworking method in operation 420. In operation 420, the mobile device 200 may also update the interworking conversion information whenever the interworking conversion information changes. Details about the information conversion information are described above in the embodiment of the vehicle 1 and the head unit 100.

If the USB cable 10 connected to the mobile device 200 is inserted into the USB port of the vehicle 1, the controller 140 may allow wired interworking between the head unit 100 and the mobile device 200. The controller 140 may also block wireless interworking. In other words, the interworking between the head unit 100 and the mobile device 200 may be converted from wireless interworking to wired interworking in operation or step 421.

The mobile device 200 may transmit the interworking conversion information to the head unit 100 through the USB cable 10 in operation 422.

In operation 424, since the head unit 100 may use the interworking conversion information received in operation 422, the head unit 100 may skip an authentication and setting process required for an initial wired connection. In operation 424, the head unit 100 may also prepare a service based on the interworking conversion information. More specifically, the head unit 100 may prepare a previously executed application to start immediately based on application state information included in the interworking conversion information.

The mobile device 200 may also prepare a projection based on the stored interworking conversion information in operation 423. The projection means transmitting an audio signal and a video signal corresponding to a request from the head unit 100. Also, the mobile device 200 may transmit an audio/video signal for providing a seamless service to the head unit 100 in operation 425.

The head unit 100 may process the received audio/video signal to output successive audio/video in operation 426. Since the head unit 100 uses audio setting information and video setting information stored during wireless interworking, the head unit 100 may not need to have a new negotiation with the mobile device 200.

Embodiments of the head unit of the vehicle, the vehicle, and the method of controlling the vehicle are described above. By defining a policy about conversion of interworking means between the vehicle and the mobile device, and controlling conversion of the interworking means according to the defined policy, it is possible to minimize a delay generated upon conversion and to provide a service without interruption.

Although several embodiments of the present disclosure have been shown and described herein, it will be understood by those having ordinary skill in the art that changes may be made in these embodiments without departing from the principles and spirit of the disclosure, the scope of which is defined in the claims and their equivalents.

What is claimed is:

1. A head unit of a vehicle interworking with a mobile device,
the head unit comprising:
a communication interface including a wired communication module and a wireless communication module;
a display configured to display an image corresponding to a video signal transmitted from the mobile device through the communication interface; and
a controller configured to determine, if a new interworking request is received from the mobile device or another mobile device when the head unit interworks with the mobile device, whether an interworking with the mobile device is wired interworking through the wired communication module or wireless interworking through the wireless communication module, and to determine whether to allow or disallow the new interworking request according to the determination,
wherein, if the new interworking request is for a wired interworking and is received from the mobile device by the wired communication module when the head unit interworks wirelessly with the mobile device through the wireless communication module, the controller allows the new interworking request for the wired interworking,
wherein, if the new interworking request for the wired interworking is received from the another mobile device by the wired communication module when the head unit interworks wirelessly with the mobile device through the wireless communication module, the controller disallows the new interworking request for the wired interworking; and
wherein, if the new interworking request is for a wireless interworking and is received from the mobile device or the another mobile device by the wireless communication module when the head unit interworks with the mobile device in a wired manner through the wired communication module, the controller disallows the new interworking request for the wireless interworking.

2. The head unit according to claim 1, wherein, if the head unit interworks with the mobile device, the controller processes an audio signal and a video signal transmitted from the mobile device, outputs the processed video signal to the display, and outputs the processed audio signal to a speaker.

3. The head unit according to claim 2, further comprising a storage device configured to store audio setting information indicating an analog channel or a digital channel to which an audio signal transmitted from the mobile device is allocated.

4. The head unit according to claim 3, wherein the storage device further stores video setting information representing information about an encoding format of a video signal transmitted from the mobile device.

5. The head unit according to claim 4, wherein, if the interworking with the mobile device is converted from wireless interworking to wired interworking, the controller processes an audio signal and a video signal transmitted from the mobile device, based on the stored audio setting information and the stored video setting information.

6. The head unit according to claim 1, wherein, if the interworking with the mobile device is converted from wireless interworking to wired interworking, the wired communication module receives interworking conversion information from the mobile device and prepares execution of an application based on the received interworking conversion information.

7. The head unit according to claim 6, wherein the interworking conversion information includes at least one of authentication information of the mobile device and application state information of the mobile device.

8. The head unit according to claim 7, wherein, if the interworking conversion information is received from the mobile device, the controller skips an authentication procedure with the mobile device based on the authentication information included in the interworking conversion information.

9. The head unit according to claim 7, wherein, if the interworking conversion information is received from the mobile device, the controller successively executes operation of an application being executed before conversion to wired interworking occurs, based on the application state information included in the interworking conversion information.

10. The head unit according to claim 1, wherein, if the new interworking request from the another mobile device is received by the wired communication module, the controller allows charging of the another mobile device.

11. The head unit according to claim 1, wherein the wired communication module includes a Universal Serial Bus (USB) communication module, and
the wireless communication module includes a Wireless-Fidelity (Wi-Fi) communication module.

12. A vehicle interworking with a mobile device, the vehicle comprising:

a communication interface including a wired communication module and a wireless communication module;
a display configured to display an image corresponding to a video signal transmitted from the mobile device through the communication interface;
a speaker configured to output sound corresponding to an audio signal transmitted from the mobile device through the communication interface; and
a controller configured to determine whether an interworking with the mobile device is wired interworking through the wired communication module or wireless interworking through the wireless communication module, and to determine whether to allow or disallow a new interworking request from the mobile device or another mobile device according to the determination,
wherein, if the new interworking request is for a wired interworking and is received from the mobile device by the wired communication module when the vehicle interworks wirelessly with the mobile device through the wireless communication module, the controller allows the new interworking request for the wired interworking,
wherein, if the new interworking request for the wired interworking is received from the another mobile device by the wired communication module when the vehicle interworks wirelessly with the mobile device through the wireless communication module, the controller disallows the new interworking request for the wired interworking; and
wherein, if the new interworking request is for a wireless interworking and is received from the mobile device or the another mobile device by the wireless communication module when the vehicle interworks with the mobile device in a wired manner through the wired communication module, the controller disallows the new interworking request for the wireless interworking.

13. The vehicle according to claim 12, wherein, if the vehicle interworks with the mobile device, the controller processes an audio signal and a video signal transmitted from the mobile device, outputs the processed video signal to the display, and outputs the processed audio signal to the speaker.

14. The vehicle according to claim 13, further comprising a storage device configured to store audio setting information indicating an analog channel or a digital channel to which an audio signal transmitted from the mobile device is allocated.

15. The vehicle according to claim 14, wherein the storage device further stores video setting information representing information about an encoding format of a video signal transmitted from the mobile device.

16. The vehicle according to claim 15, wherein, if the interworking with the mobile device is converted from wireless interworking to wired interworking, the controller processes an audio signal and a video signal transmitted from the mobile device based on the stored audio setting information and the stored video setting information.

17. The vehicle according to claim 12, wherein, if the interworking with the mobile device is converted from wireless interworking to wired interworking, the wired communication module receives interworking conversion information from the mobile device and prepares execution of an application based on the received interworking conversion information.

18. The vehicle according to claim 17, wherein the interworking conversion information includes at least one of authentication information of the mobile device and application state information of the mobile device.

19. The vehicle according to claim 18, wherein, if the interworking conversion information is received from the mobile device, the controller skips an authentication procedure with the mobile device based on the authentication information included in the interworking conversion information.

20. The vehicle according to claim 19, wherein, if the interworking conversion information is received from the mobile device, the controller successively executes operation of an application being executed before conversion to wired interworking occurs based on the application state information included in the interworking conversion information.

21. The vehicle according to claim 12, wherein, if the new interworking request from the another mobile device is received by the wired communication module, the controller allows charging of the another mobile device.

22. A method of controlling a vehicle interworking with a mobile device, the method comprising:
determining, if a new interworking request is received from the mobile device or another mobile device when the vehicle interworks with the mobile device, whether an interworking with the mobile device is wired interworking or wireless interworking;
determining, if it is determined that the interworking with the mobile device is wireless interworking, whether the new interworking request is received by a wired communication module or a wireless communication module;
allowing the new interworking request for a wired interworking, if it is determined that the new interworking request for the wired interworking is received from the mobile device by the wired communication module when the vehicle interworks with the mobile device in a wireless manner;
disallowing the new interworking request for the wired interworking, if it is determined that the new interworking request for the wired interworking is received from the another mobile device by the wired communication module when the vehicle interworks with the mobile device in a wireless manner; and
disallowing the new interworking request for a wireless interworking, if it is determined that the new interworking request for the wireless interworking is received from the mobile device or the another mobile device by a wireless communication module when the vehicle interworks with the mobile device in a wired manner.

23. The method according to claim 22, wherein, if the new interworking request is received from the another mobile device when the vehicle interworks wirelessly with the mobile device, the method comprises disallowing the new interworking request.

* * * * *